(12) United States Patent
Feeny

(10) Patent No.: US 8,181,967 B2
(45) Date of Patent: May 22, 2012

(54) VARIABLE CLEARANCE PACKING RING

(75) Inventor: Sean Douglas Feeny, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 1374 days.

(21) Appl. No.: 11/426,739

(22) Filed: Jun. 27, 2006

(65) Prior Publication Data

US 2007/0296159 A1    Dec. 27, 2007

(51) Int. Cl.
    *F16J 15/44* (2006.01)
(52) U.S. Cl. .................. 277/412; 277/413; 415/173.1
(58) Field of Classification Search .......... 277/411–413,
        277/416, 421, 545, 578; 415/174.2, 174.5,
                415/173.1, 173.5, 170.1, 229–230
    See application file for complete search history.

(56) References Cited

U.S. PATENT DOCUMENTS

| | | | | |
|---|---|---|---|---|
| 561,794 A * | 6/1896 | Kelley | ........................ | 277/510 |
| 644,696 A * | 3/1900 | Swain | ........................ | 277/510 |
| 922,635 A * | 5/1909 | Sieger | ........................ | 277/545 |
| 1,505,462 A * | 8/1924 | Hillman | ........................ | 277/533 |
| 1,547,919 A * | 7/1925 | Gustav | ........................ | 277/545 |
| 3,464,708 A * | 9/1969 | Hamilton | ........................ | 277/545 |
| 4,436,311 A | 3/1984 | Brandon | | |
| 5,002,288 A | 3/1991 | Morrison et al. | | |
| 5,395,124 A | 3/1995 | Brandon | | |
| 5,464,226 A | 11/1995 | Dalton | | |
| 5,603,510 A | 2/1997 | Sanders | | |
| 5,709,388 A | 1/1998 | Skinner et al. | | |
| 5,810,365 A | 9/1998 | Brandon et al. | | |
| 5,934,684 A | 8/1999 | Brandon et al. | | |
| 5,971,400 A | 10/1999 | Turnquist et al. | | |
| 6,022,027 A | 2/2000 | Chevrette et al. | | |
| 6,065,754 A | 5/2000 | Cromer et al. | | |
| 6,139,018 A | 10/2000 | Cromer et al. | | |
| 6,318,728 B1 | 11/2001 | Addis et al. | | |
| 6,502,823 B1 | 1/2003 | Turnquist et al. | | |
| 6,572,114 B1 * | 6/2003 | Magoshi et al. | ........................ | 277/411 |
| 6,651,986 B2 | 11/2003 | Chevrette et al. | | |
| 6,695,316 B2 | 2/2004 | Popa et al. | | |
| 6,715,766 B2 | 4/2004 | Kirby, III et al. | | |
| 6,786,487 B2 | 9/2004 | Dine et al. | | |
| 6,935,634 B2 | 8/2005 | Zuo et al. | | |

* cited by examiner

*Primary Examiner* — Vishal Patel
(74) *Attorney, Agent, or Firm* — Cantor Colburn LLP

(57) ABSTRACT

Disclosed is a variable clearance packing ring including a plurality of arcuate packing ring segments positional seriatim, a plurality of biasing member interfaces defined by the plurality of arcuate packing ring segments, and a biasing member interactive with one of the plurality of interfaces on one of the plurality of arcuate segments and one of the plurality of interfaces on an adjacent one of the plurality of arcuate segments.

5 Claims, 6 Drawing Sheets

VARIABLE CLEARANCE PACKING RING

FIELD OF THE INVENTION

This disclosure relates generally to packing rings used in rotary machines, and more particularly to variable clearance packing rings used in rotary machines such as steam turbines.

BACKGROUND OF THE INVENTION

In rotary machines such as steam turbines, seals are provided between rotating and stationary components. For example, in steam turbines, it is customary to employ a plurality of arcuate packing ring segments (bearing labyrinthian features) to form a labyrinth seal about and between stationary and rotating components. Typically, the arcuate packing ring segments are disposed in an annular groove in the stationary component concentric about the axis of rotation of the machine, and hence concentric to the sealing surface of the rotating component. The sealing function is achieved by creating turbulent flow of a working media, such as steam, as it passes through the relatively tight clearances within the labyrinth defined by the seal face teeth and the opposing surface of the rotating component.

In order to avoid damage to the rotor and packing ring during transient conditions such as startup and shutdown, variable clearance packing rings have been used. Variable clearance packing rings typically employ springs that bias and hold the ring segments in large clearance positions during transient conditions. When disposed in large clearance positions, seal faces carried by the packing rings are spaced substantially outwardly of the rotary component, avoiding contact between the segments and rotor. At machine start-up the working fluid medium (steam) within the grooves of the stationary component is pressurized. Presence of the pressurized medium within the grooves causes a pressure build up. This pressure build up urges the segments to move inwardly against the bias of the springs, towards inner or small clearance positions. When the pressure in the groove overcomes the opposing bias of the springs, the seal faces of the segments create a desired labyrinthian seal with the rotor.

Springs used to bias the segments into the large clearance positions are typically located within the annular groove, disposed between a hook portion of the packing ring segment and a locating flange of the casing. Springs disposed in this relatively small region of the annular groove can be difficult to install, particularly in smaller turbine units. In addition, a large hook portion relative to the dimensions the other ring components is required. This small region and large hook portion can make ring-casing assembly difficult. Thus, it would be desirable to dispose the biasing spring in a more spacious region of the groove, allowing for a less cumbersome hook portion, and easier ring-casing assembly.

BRIEF DESCRIPTION OF THE INVENTION

Disclosed is a variable clearance packing ring including a plurality of arcuate packing ring segments positional seriatim, a plurality of biasing member interfaces defined by the plurality of arcuate packing ring segments, and a biasing member interactive with one of the plurality of interfaces on one of the plurality of arcuate segments and one of the plurality of interfaces on an adjacent one of the plurality of arcuate segments.

Also disclosed is a method for actuating a variable clearance packing ring, the method including biasing at least one of a plurality of arcuate packing ring segments into a clearance position via a biasing member interactive with the at least one of the plurality of arcuate packing ring segments and an adjacent one of the plurality of arcuate packing ring segments.

BRIEF DESCRIPTION OF THE DRAWINGS

The foregoing and other features and advantages of the present invention should be more fully understood from the following detailed description of illustrative embodiments taken in conjuncture with the accompanying Figures in which like elements are numbered alike in the several Figures.

DETAILED DESCRIPTION OF THE INVENTION

Figure 1:
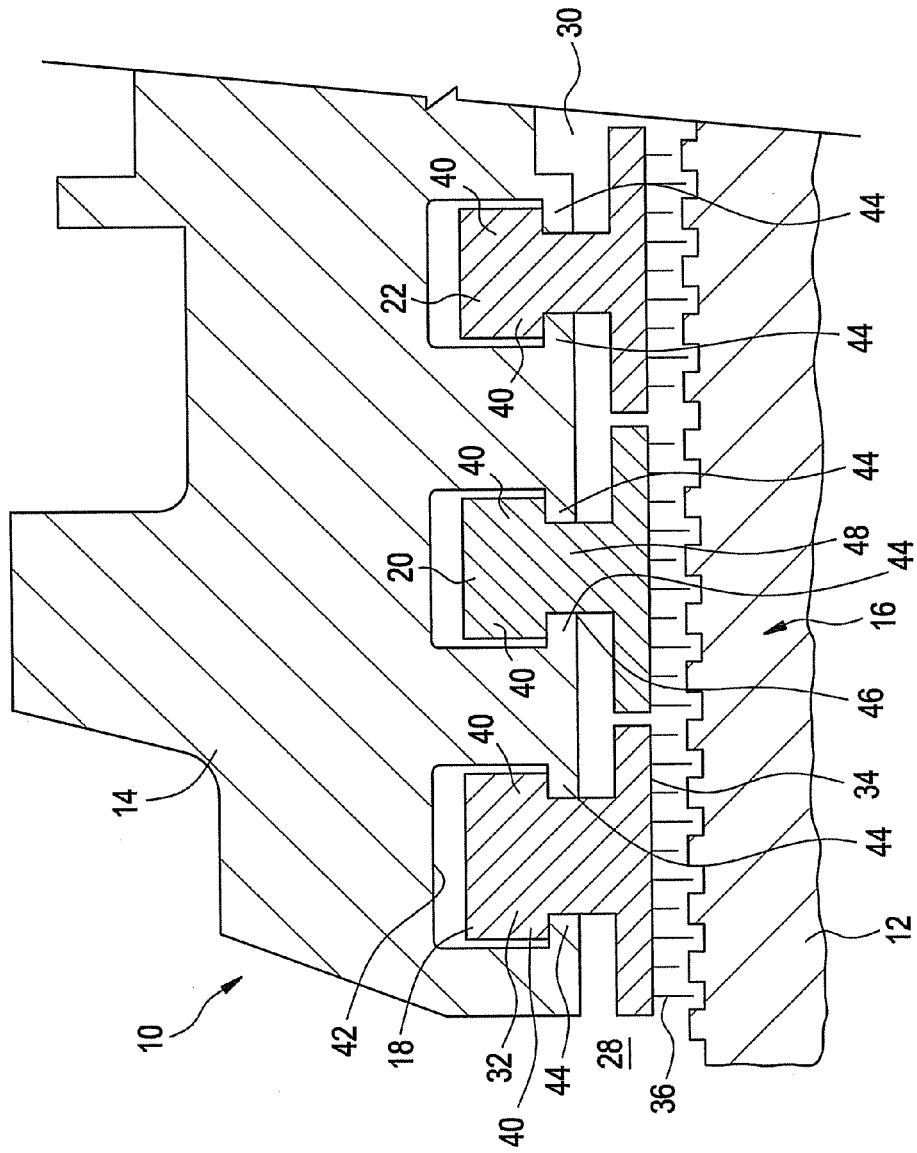
FIG. 1 is a partial cross-section view illustrating a schematic of a prior art rotary machine.

For clarity and perspective, there is illustrated in FIG. 1 a portion of a rotary machine (for example, a steam turbine) generally designated 10, having a rotary component 12 at least partially disposed in a casing 14, wherein the rotary component 12 is supported for rotation by conventional means, not shown, within the casing 14. A multi-stage labyrinth seal 16, including a plurality of packing rings 18, 20 and 22, is disposed about the rotary component 12, separating high and low pressure regions 28 and 30, respectively. Each packing ring is formed of an annular array of arcuate packing ring segments 32. Each packing ring segment 32 has a sealing surface 34 with projecting radial teeth 36 acting as partial barriers to steam flowing from the high 28 to low 30 pressure regions.

The casing 14, which was briefly mentioned above, has a generally dovetail-shaped annular groove 42. The annular groove 42 is located along the radially innermost portions of the casing 14, defined by a pair of locating flanges 44 which extend axially toward one another defining a slot 46 therebetween. A neck portion 48 of each segment 32 interconnects the locating hooks 40 with the sealing surface 34, and extends through the slot 46.

It will be appreciated that the segments 32 may comprise variable clearance packing ring segments that are movable between large clearance positions, and sealed, small clearance positions in relation to the rotary component 12. In a typical variable clearance packing ring, an biasing member (not illustrated), such as a spring, may reside between at least one of the locating flanges 44 of the casing 14, and hooks 40 of packing rings 18, 20, and 22. Disposal of the biasing member between these components can be difficult, particularly in smaller turbine units, and require overly large and cumbersome hooks 40 to be effective.

Figure 2:
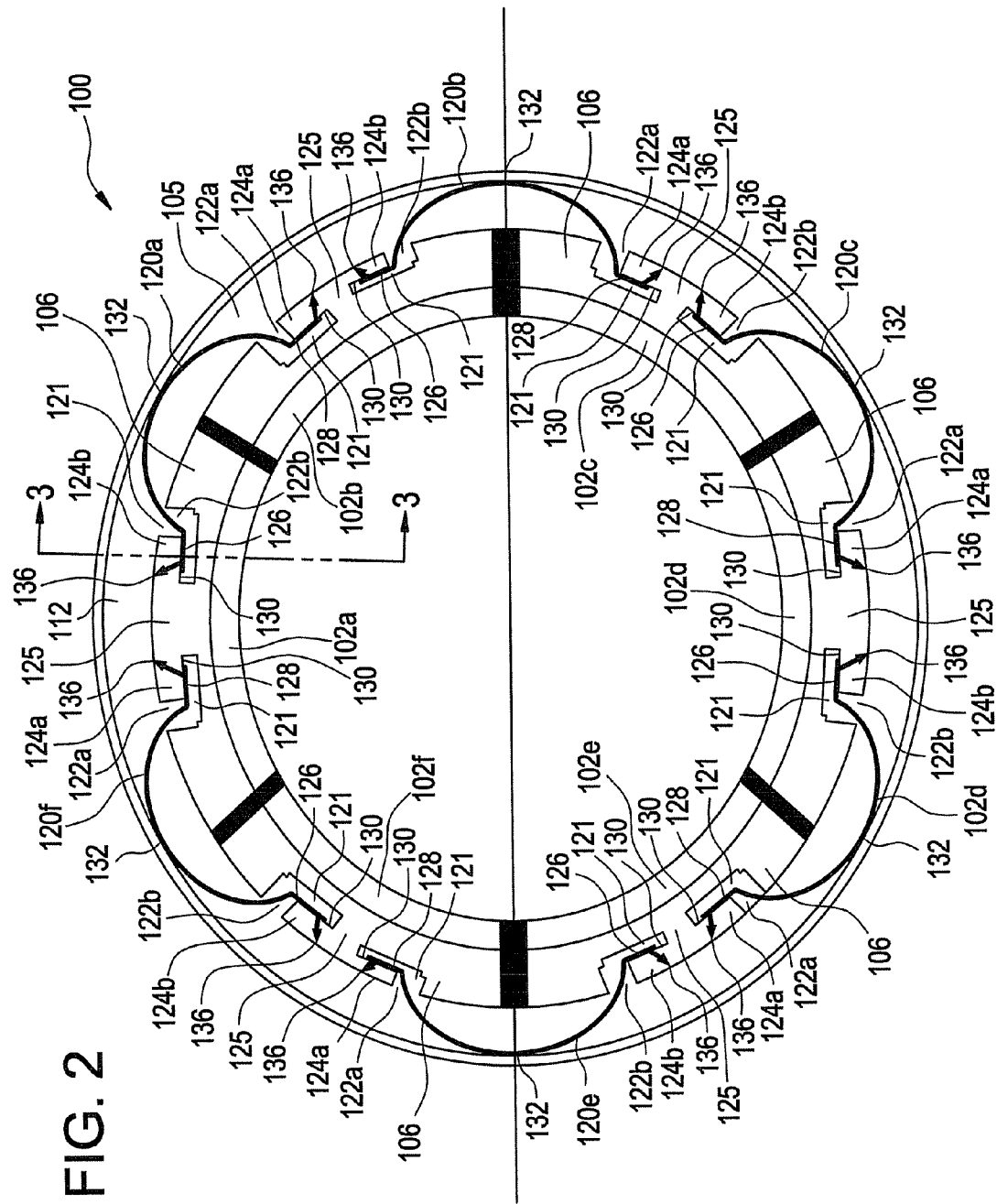
FIG. 2 is a transverse axial section view illustrating a schematic of a variable clearance packing ring arrangement.
Figure 3:
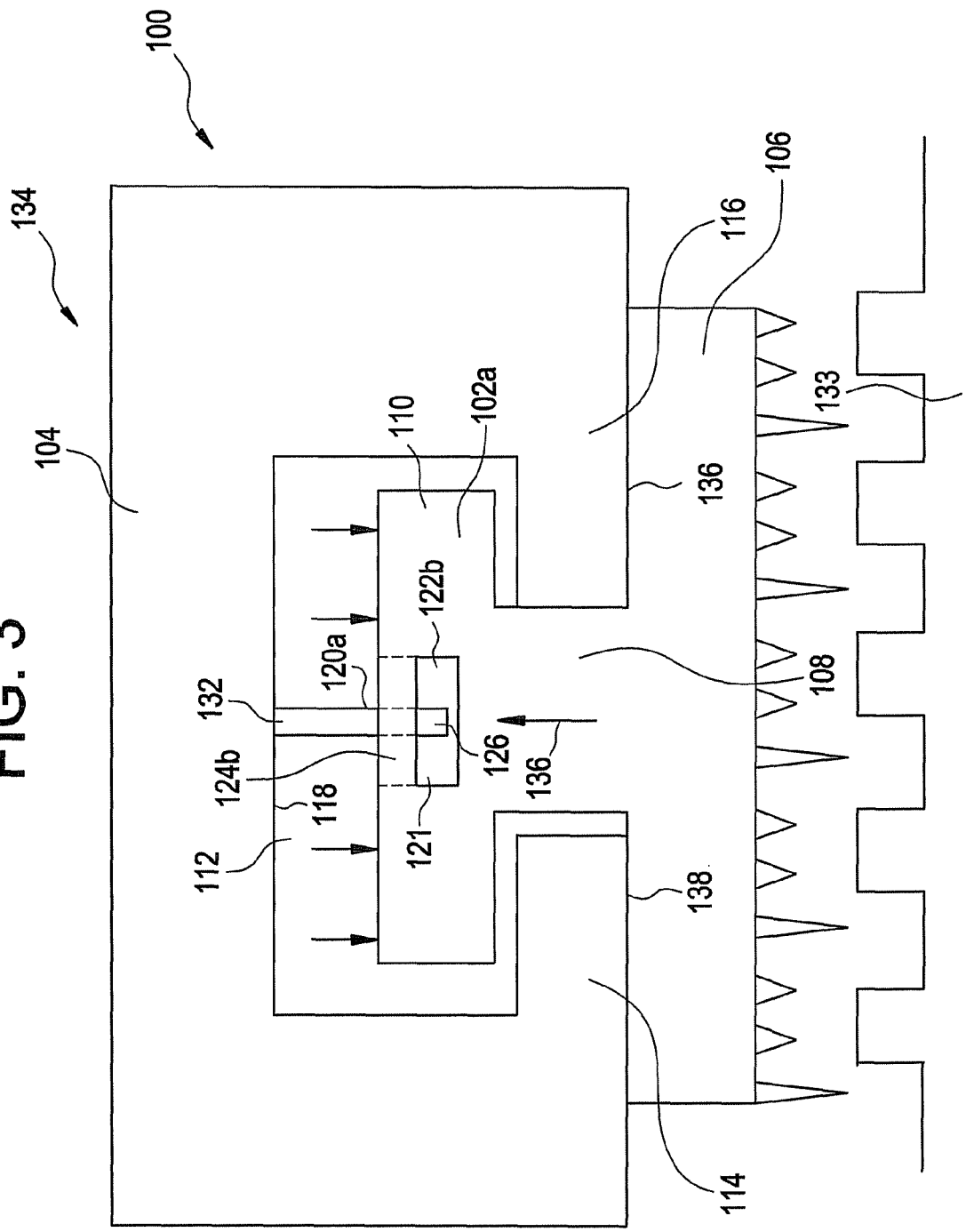
FIG. 3 is a radial cross-section view of a schematic of the variable clearance packing ring arrangement of FIG. 2 along line 3-3 in an open position.
Figure 4:
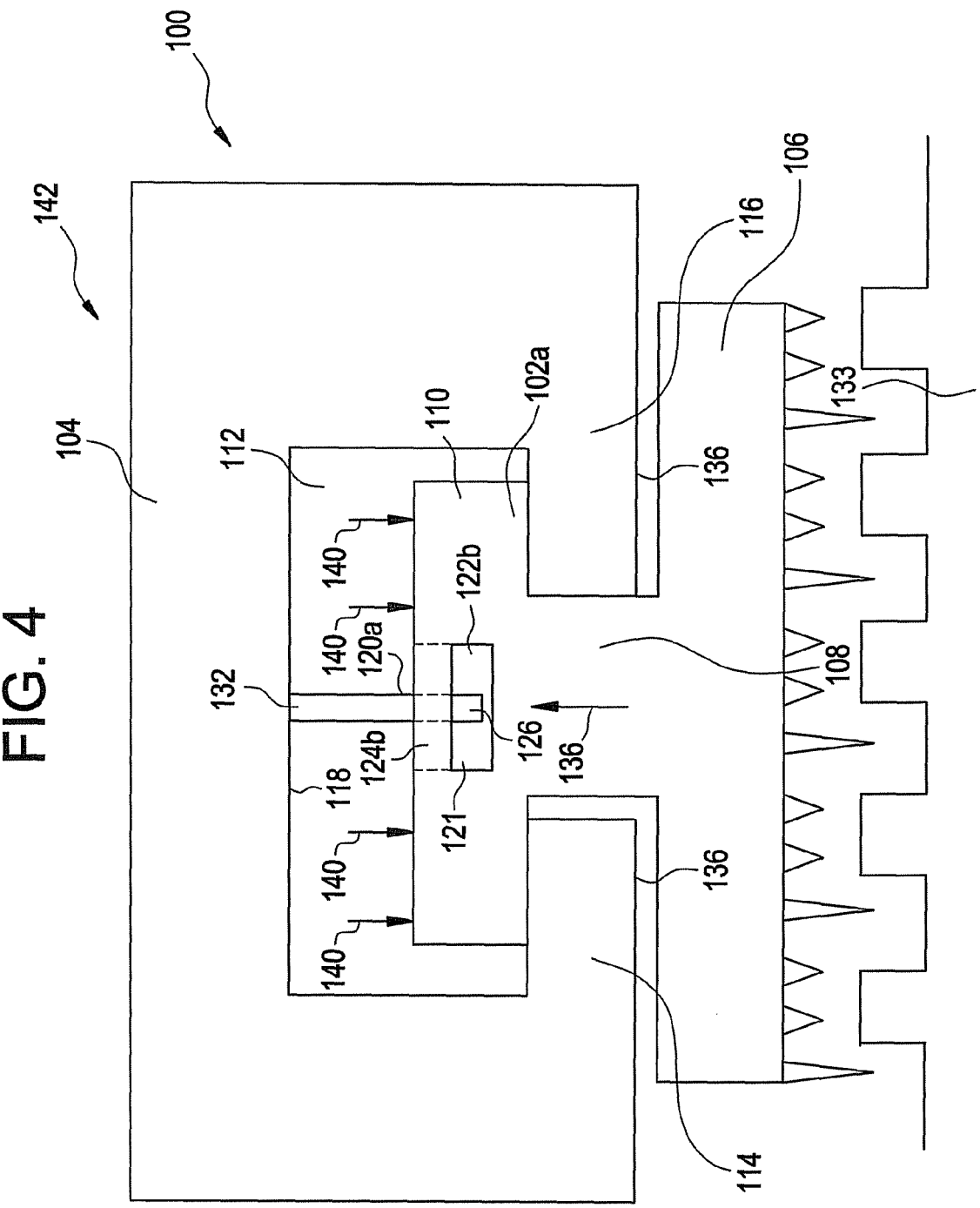
FIG. 4 is a radial cross-section view of a schematic of the variable clearance packing ring arrangement of FIG. 2 along line 3-3 in an closed position.

Discussed hereinbelow is a variable clearance packing ring arrangement 100 that allows for disposal of an biasing member away from the above mentioned position between the locating flanges 44 and packing ring hooks 40. Referring to FIGS. 2, 3, and 4 the variable clearance packing ring arrangement 100 is illustrated and includes a plurality of arcuate packing ring segments 102a-f and a casing 104, each to be used in a rotary machine. The segments 102a-f are positioned seriatim to form an annulus 105, with each segment including a sealing portion 106, a neck portion 108, and a casing portion 110. The casing portion 110 is disposable within an annular groove 112 defined by the casing 104, which includes a first locating flange 114, a second locating flange 116, and a biasing member surface 118. The arrangement 100 additionally includes at least one biasing member 120a-f, which may associate at least one of the plurality of packing ring segments 102a-f with the biasing member surface 118 of the casing 104, as shown in FIG. 2.

In an exemplary embodiment, the casing portion 110 of each packing ring segment 102a-f defines at least one biasing member interface 121, including spring cavity 122a-b and at least one spring flange 124a-b. The spring cavities and spring flanges combine to form a plurality of T structures 125, as shown in FIG. 2. The spring cavities 122a-b of each casing portion 110 is configured to be associable with either of a first ring end 126 and second ring end 128 of each of the biasing members 120a-f. The first ring ends 126 and second ring ends 128 of the biasing members 120a-f are disposable within the spring cavities 122a-b so as to allow at least partial adjacency with the spring flanges 124a-b. In FIG. 2, this adjacency is shown between the ring ends 126 and 128 and a cavity surface 130 of the spring flanges 124a-b.

As is also shown in FIG. 2, along with associating each segment with the biasing member surface 118 of the casing 104, the biasing members 120a-f also associate adjacent packing ring segments 102a-f with each other. For example, biasing member 120a associates packing ring segment 102a with packing ring segment 102b, while also associating both packing ring segments 102a and 102b with the biasing member surface 118 of the casing 104 at association point 132. Similarly, biasing member 120f associates packing ring segment 102a with packing ring segment 102f, while associating both packing ring segments 102a and 102f with the biasing member surface 118 of the casing 104 at association point 132. Thus, packing ring segment 102a is associated with each segment (102b and 102f) to which it is adjacent, while also being associated with the biasing member surface 118 of the casing 104 via at least one biasing member, in this case biasing members 120a and 120f. It should be appreciated that the biasing members 120a-f may be any type of spring, such as a tension springs (including torsional or flat springs), which function to bias the packing ring structures 102a-f towards the biasing member surface 118 of the casing 104 (which will be discussed in greater detail below), and away from rotary component 133. It should also be appreciated that though the figures show six packing ring segments 102a-f comprising the annulus 105, the annulus 105 may comprise any number of segments greater than or equal to two.

Referring particularly to FIGS. 3 and 4, the manner in which the apparatus 100 functions will now be discussed. In FIG. 3 the packing ring segment 102a is shown in an open or clearance position 134, which occurs while the rotary machine is in a transient condition. Transient conditions occur during start up and shut down, as will be recognized by one of ordinary skill in the art. The segment 102a is "pulled" into the open position 134 via the biasing members 120a and 120f. Though only biasing member 120a is shown in FIGS. 3 and 4, biasing member 120f, as well as the other biasing members 120b-e, will function in conjunction with the segments 102a-f to which they associate in the same manner that biasing member 120a functions with segment 102a in FIGS. 3 and 4.

In an exemplary embodiment, the biasing member 120a pulls segment 102a towards the biasing member surface 118 of the casing 104 (and away from the rotary component 133) via its association with the spring cavity 122b and spring flange 124b of segment 102a, and its association with the spring cavity 122a and spring flange 124b of the segment 102a (the association with segment 102b being shown only in FIG. 2). Referring to FIG. 2, the biasing member 120a (as well as the rest of the biasing members 120b-f) is shown as a flat tension spring with ends 126 and 128 having been forced or "bent" away from a flat rest position in a direction relatively towards the annulus 105. While in a "bent" position (as shown in FIG. 2), the first ring end 126 may be disposed in the spring cavity 122b (adjacent to the spring flange 124b) of the segment 102a, and the second spring end 128 may be disposed in the spring cavity 122a (adjacent to spring flange 124a) of segment 102b. Since the ends 126 and 128 biasing member/spring 102a want to move back towards the flat rest position (relatively towards the biasing member surface 118), there is a resultant force 136 applied by the first ring end 126 and second ring end 128 on the respective spring flanges 124b and 124. This resultant force 136 pulls the segments 102a and 102b (as shown with reference to 102a in FIG. 3) toward the biasing member surface 118 of the casing 104, moving the sealing portion 106 of the segments 102a and 102b away from the rotary component 133. The segments 102a and 102b are pulled in this direction until the sealing portions 106 of the segments 102a and 102b (only 102a being shown in FIG. 3) contacts a relative bottom surface 138 of the locating flanges 114 and 116 of the casing 104. Thus, as shown in FIG. 3, the segment 102a may be held in the open position 134 during transient conditions of the rotary machine. It should be appreciated that though only 102a is shown in FIG. 3, in an exemplary embodiment, each segment 102a-f will be held in this open position 134 during transient conditions of the rotary machine.

Referring now to FIG. 4, under operating conditions of the rotary machine, a fluid medium (such as steam) enters the annular groove 112, creating a steam pressure force 140 upon the casing portion 110 of the segment 102a (as well as the other segments 102b-f), wherein the steam pressure force 140 is opposed to the resultant force 136 created by the biasing member 102a. The steam pressure force 140 overcomes the resultant force 136, and "pushes" the segment 102a towards the rotary component 133, allowing the sealing portion 106 of the segment 102a to seal with the rotary components, and positioning the segment 102a (as well as the rest of the segments 102b-f) into a closed position 142. When the next transient condition of the rotary machine occurs, steam pressure dissipates, and the biasing members 120a-f again move the segments 102a-f into the open position 134.

Figure 5:
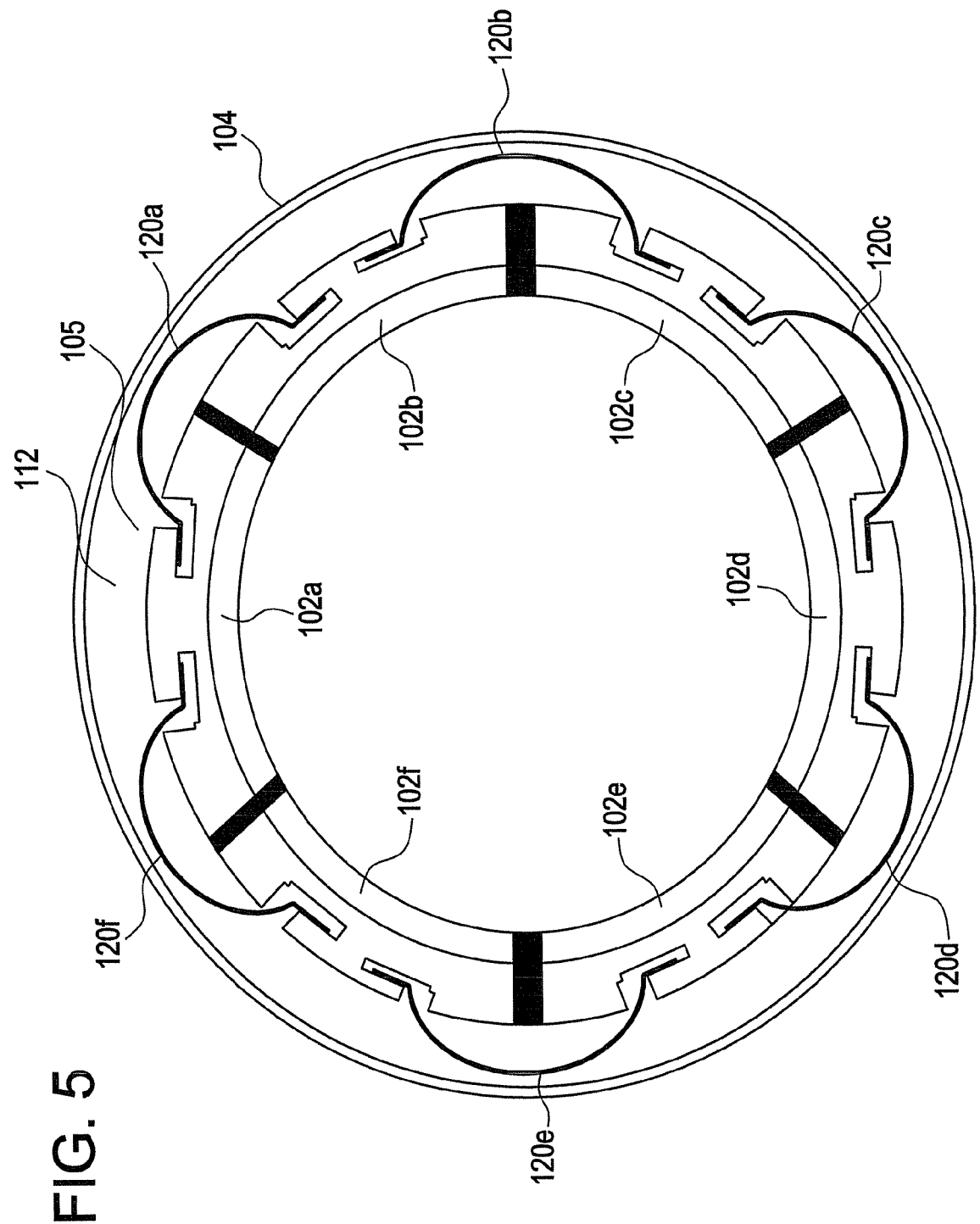
FIG. 5 is a transverse axial section view illustrating a schematic of a variable clearance packing ring arrangement showing biasing members that do not contact a casing.

Referring to FIG. 5, it should be appreciated that the biasing members 120a-f may associate the adjacent packing ring segments 102a-f with each other without also contacting the casing 104. As shown in this Figure, the biasing members 120a-f may bias the segments 102a-f away from the rotary component 133 (not shown in FIG. 5) without associating the segments 102a-f with the casing 104. As above and in an exemplary embodiment, the biasing members 120a-f may be flat springs that are "bent" away from the rest position.

Figure 6:
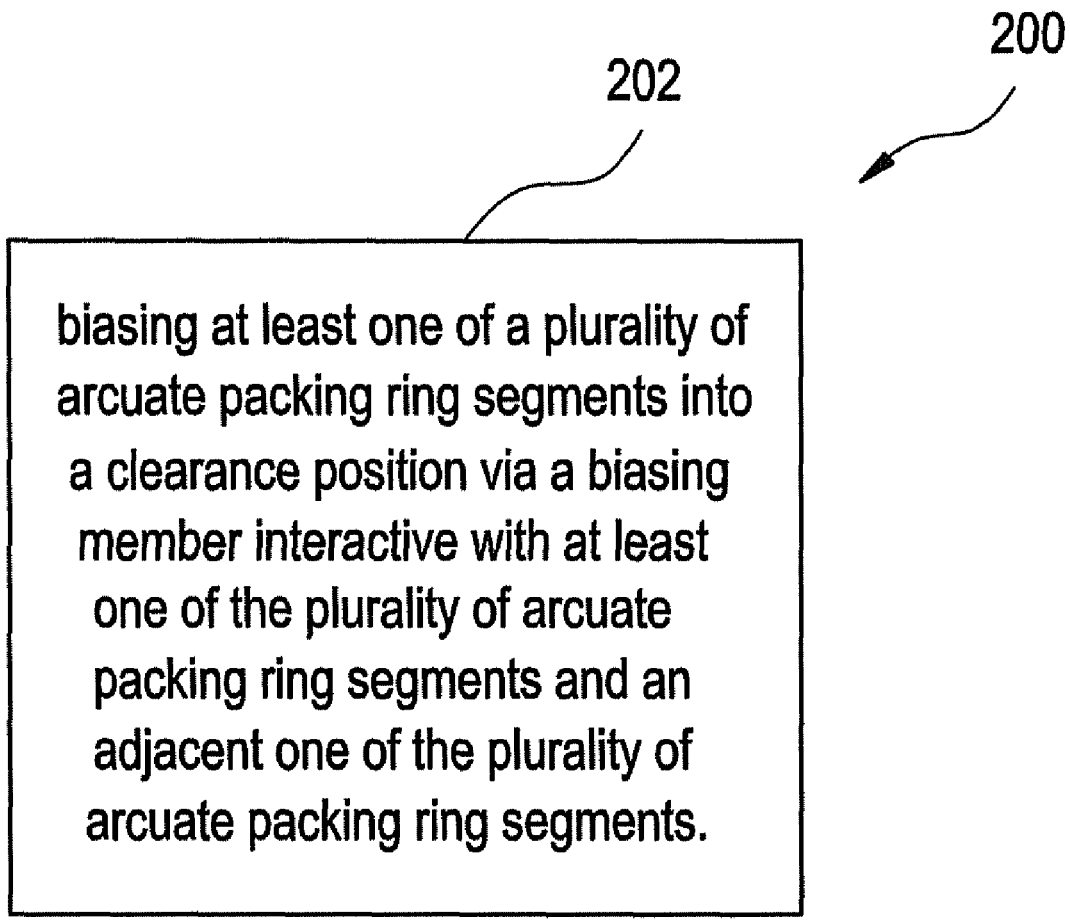
FIG. 6 is a block diagram illustrating a method for actuating a variable clearance packing ring.

Referring to FIG. 6, a method 200 for actuating a variable clearance packing ring arrangement is illustrated and includes biasing at least one packing ring segment 102a-f into a clearance position 134 towards an biasing member surface 118 of a casing 104 via at least one biasing member 120*a-f*, as shown in operational block 202, wherein the at least one packing ring segment 102*a-f* may be held in the clearance position 134 during transient conditions of the rotary machine. The biasing members 120*a-f* may accomplish this biasing via association between a cavity end 110 of the at least one packing ring segment 102*a-f* and the biasing member surface 118 of the casing 104, and/or association of adjacent packing ring segments 102*a-f* (within an annulus 105 formed by the segments 102*a-f*) with each other.

The method 200 also includes biasing at least one of a plurality of arcuate packing ring segments 102*a-f* into a clearance position 134 via a biasing member 120*a-f* interactive with at least one of the plurality of arcuate packing ring segments 102*a-f* and an adjacent one of the plurality of arcuate packing ring segments 102*a-f*, as shown in operational block 202. I should be appreciated that the biasing members 120*a-f* may hold the segments 102*a-f* in the clearance position 134 during transient conditions of a rotary machine.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A variable clearance packing ring configured for use in a rotary machine that includes a rotary component comprising:
   a plurality of arcuate packing ring segments positional seriatim;
   a plurality of biasing member interfaces defined by said plurality of arcuate packing ring segments; and
   a biasing member interactive with one of said plurality of interfaces on one of said plurality of arcuate segments and one of said plurality of interfaces on an adjacent one of said plurality of arcuate segments, said biasing member configured to bias said plurality of arcuate packing ring segments away from the rotary component.

2. An apparatus according to claim 1, wherein each of said plurality of arcuate packing ring segments defines two biasing member interfaces.

3. An apparatus according to claim 2, wherein said a biasing member is a plurality of biasing members, two of said plurality of biasing members being interactive with each of said plurality of arcuate packing ring segments via said two biasing member interfaces defined by each of said plurality of arcuate packing ring segments.

4. An apparatus according to claim 3, wherein each of said plurality of arcuate packing ring segments is associated with each adjacent arcuate packing ring segment via said plurality of biasing members.

5. An arrangement according to claim 1, wherein said a biasing member is a tension spring.

\* \* \* \* \*